US006238146B1

(12) United States Patent
Satran et al.

(10) Patent No.: US 6,238,146 B1
(45) Date of Patent: May 29, 2001

(54) TANGENTIAL CUTTING INSERT

(75) Inventors: Amir Satran; Yaron Eizen, both of Kfar Vradim; Yuval Penhas, Haifa, all of (IL)

(73) Assignee: Iscar Ltd., Migdal Tefen (IL)

( * ) Notice: Subject to any disclaimer, the term of this patent is extended or adjusted under 35 U.S.C. 154(b) by 0 days.

(21) Appl. No.: 09/349,972

(22) Filed: Jul. 9, 1999

(30) Foreign Application Priority Data

Jul. 13, 1998 (IL) .......................................... 125331
Mar. 31, 1999 (IL) .......................................... 129297

(51) Int. Cl.⁷ .................................................. B23B 27/22
(52) U.S. Cl. ............................ 407/113; 407/114; 407/115
(58) Field of Search ................................. 407/114, 113, 407/115, 116

(56) References Cited

U.S. PATENT DOCUMENTS

| 2,688,791 | * | 9/1954 | Luers et al. ........................... 407/115 |
| 3,128,804 | * | 4/1964 | Scott ................................. 407/115 X |
| 3,416,209 | | 12/1968 | Contrucci et al. . |
| 3,490,117 | | 1/1970 | Hertel . |
| 3,701,187 | | 10/1972 | Erkfritz . |
| 4,124,326 | * | 11/1978 | Cost ..................................... 407/114 |
| 4,790,693 | | 12/1988 | Koblesky . |
| 5,158,402 | * | 10/1992 | Satran et al. ........................... 407/113 |
| 5,333,972 | * | 8/1994 | Bernadic et al. ..................... 407/113 |
| 6,074,137 | * | 6/2000 | Betman et al. ................... 407/114 X |

FOREIGN PATENT DOCUMENTS

| 2549757 | * | 5/1977 | (DE) .................................... 407/114 |
| 195 16 946 A1 | | 11/1996 | (DE) . |
| 197 04 931 C1 | | 3/1998 | (DE) . |
| WO 93/19879 | | 10/1993 | (WO) . |
| WO 97/17157 | | 5/1997 | (WO) . |
| WO 98/34747 | | 8/1998 | (WO) . |

* cited by examiner

Primary Examiner—Henry Tsai
(74) Attorney, Agent, or Firm—Pennie & Edmonds LLP (57) ABSTRACT

A tangential cutting insert has a body with an operative front surface associated with upper and lower main cutting edges, side auxiliary cutting edges and corner cutting edges therebetween. All cutting edged have rake surfaces formed at the front surface and extending from their associated cutting edges in an inward direction of the cutting insert. The cutting insert has an imaginary reference plane passing through extremities of the cutting corner edges thereof. Each of the main cutting edges extends from its associated comer edges in an inward direction of the cutting insert away from the reference plane.

17 Claims, 14 Drawing Sheets

TANGENTIAL CUTTING INSERT

FIELD OF THE INVENTION

The present invention refers to a tangential (on-edge) cutting insert for mounting thereof on cutting tools for different cutting operations.

BACKGROUND OF THE INVENTION

Tangential cutting inserts are often used with rotary milling cutters such as slotting cutters or extended-flute cutters, with turning cutting tools or the like. Examples of such use may be found in U.S. Pat. No. 3,416,209, U.S. Pat. No. 3,490,117, U.S. Pat. No. 3,701,187 and U.S. Pat. No. 4,790,693.

A conventional tangential cutting insert of the kind to which the present invention refers has a prismatic body with a clamping screw bore and with an operative front surface which is generally parallel to the clamping screw bore's axis and which is associated with upper and lower cutting edges and side edges extending therebetween and merging therewith via insert comer edges. In such conventional tangential cutting inserts, the side and comer edges are usually not used in cutting operations, being consequently not provided with appropriate cutting geometry.

WO 97/17157 discloses a double-sided indexable tangential cutting insert for face milling operations in which front and rear surfaces are each associated with upper and lower main cutting edges, two auxiliary side cutting edges therebetween and four corner edges at which the main and auxiliary cutting edges meet. The front and rear surfaces are each formed with a chip groove extending along the circumference thereof between the associated cutting edges and a planar central positioning surface projecting outwardly from the cutting edges.

It is the object of the present invention to provide a new tangential cutting insert of the above kind.

SUMMARY OF THE INVENTION

In accordance with the present invention, there is provided a tangential cutting insert having a body with an operative front surface associated with upper and lower main cutting edges, side auxiliary cutting edges and comer cutting edges therebetween, all cutting edges having rake surfaces formed at said front surface and extending from their associated cutting edges in an inward direction of the cutting insert, the insert having an imaginary reference plane passing through extremities of the cutting comer edges thereof; characterized in that each of said main cutting edges extends from its associated comer edges in an inward direction of the insert away from said reference plane.

Preferably, each of the main cutting edges hav two lateral component cutting edges extending from adjacent comer edges in the inward direction of the insert, and a central component cutting edge therebetween substantially co-directional with said reference plane.

Preferably, the operative front surface has two component surfaces that extend from the associated auxiliary side edges in the inward direction of the insert. By virtue of this design, the insert is provided with a pair of appropriate positioning surfaces by means of the geometry of the operative front surface generally repeating the geometry of the main cutting edges.

Preferably, the cutting insert is indexable around an axis of 180° rotational symmetry, which axis is substantially parallel to the operative front surface and substantially transverse to the main cutting edge. The body of the cutting insert has a prismatic shape with a pair of identical front and rear surfaces at two ends thereof, opposite upper and lower surfaces and a pair of opposite side surfaces extending between the front and rear surfaces.

Preferably, the rake surfaces of the cutting edges are oriented so that an acute angle formed thereby with a normal to said imaginary plane is different for the main, auxiliary and corner cutting edges. The value of this angle may vary along these cutting edges.

The cutting insert geometry of the present invention is particularly suitable for the manufacturing of cutting inserts by net-shape processes, where no grinding operations are required, by virtue of which any desired design, in particular, non-planar, of the chip rake and relief surfaces may be obtained.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

FIGS. 1, 2, 3 and 4 illustrate a double-sided tangential cutting insert 1 according to the present invention, indexable 180° around an axis of rotational symmetry A so that the cutting insert 1 has twelve edges capable of functioning as effective cutting edges, and eight effective cutting comers.

The insert is capable of being used in a wide range of different cutting operations.

Figure 1:
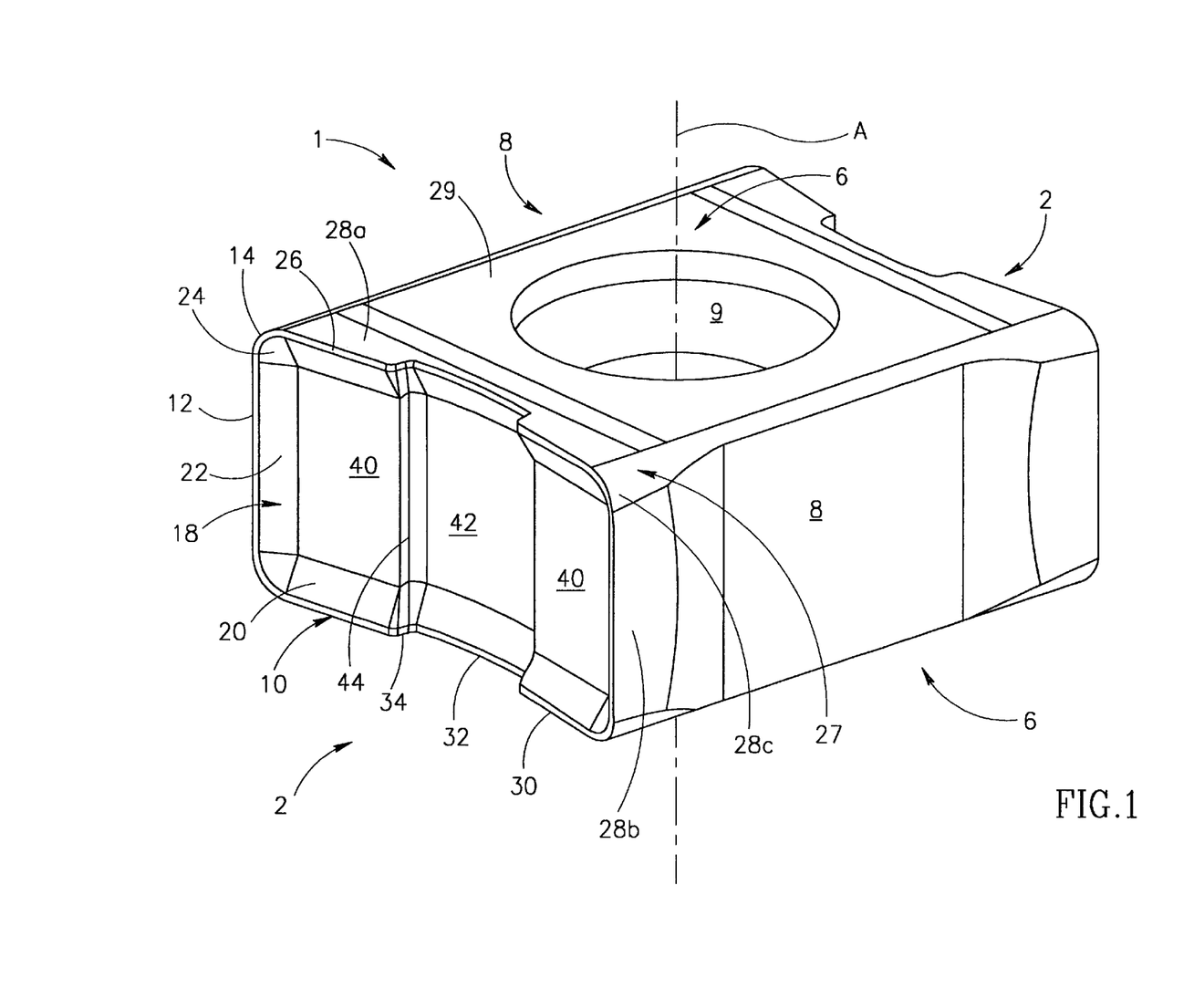
FIG. 1 is perspective view of a cutting insert according to the present invention.

As seen in FIG. 1, the cutting insert 1 has a prismatic body with front and rear operative surfaces 2, opposite upper and lower surfaces 6 and a pair of opposite side surfaces 8 extending therebetween. The insert 1 has a clamping screw bore 9 having a longitudinal axis coinciding with the axis of symmetry A and extending between the upper and lower surfaces 6.

The front and rear operative surfaces 2 have identical design and, therefore, only one of these surfaces, namely the operative front surface 2, will further be described.

Figure 2:
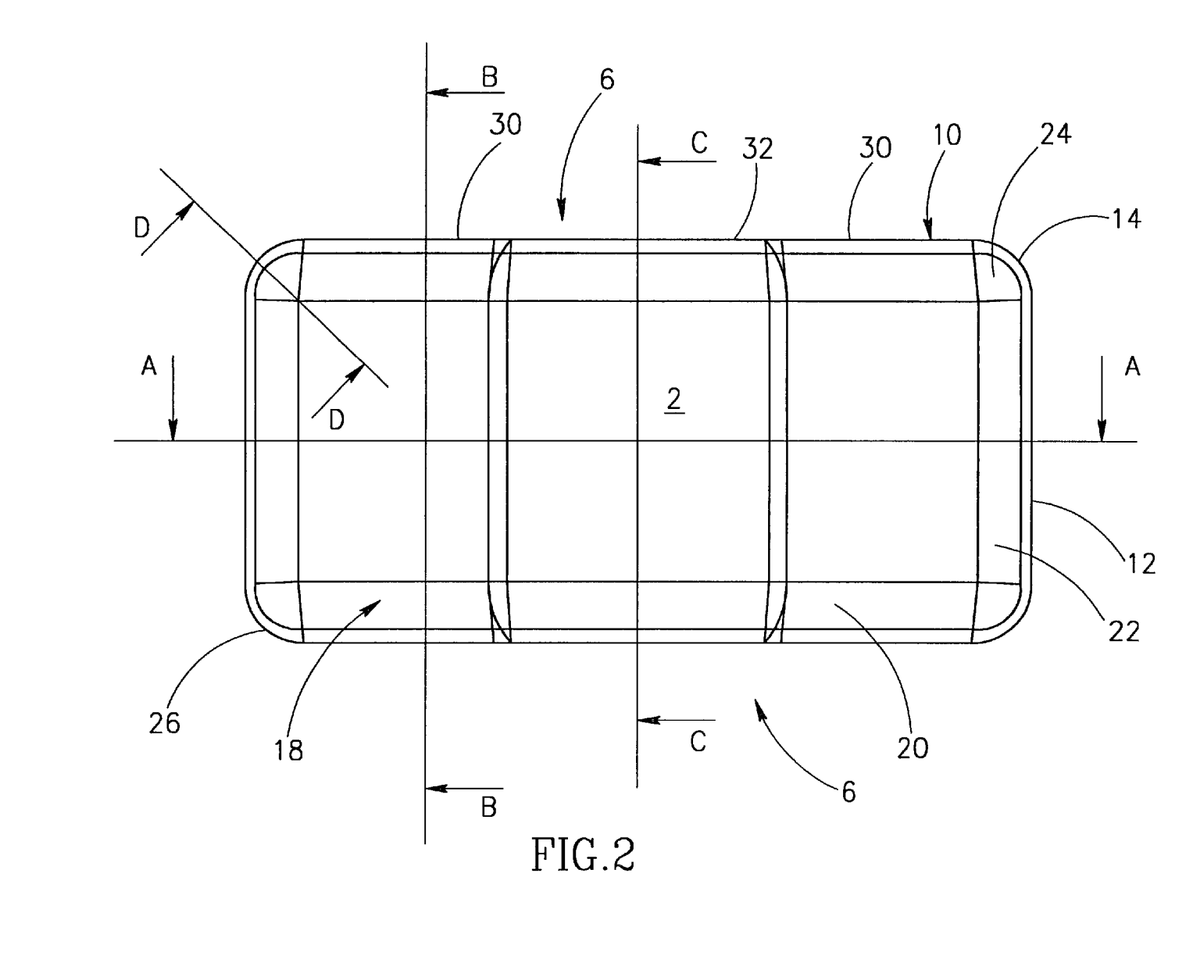
FIG. 2 is a front view of the cutting insert shown in FIG. 1.

As seen in FIGS. 1 and 2, the front operative surface 2 is bound by identical upper and lower main cutting edges 10 associated with the upper and lower surfaces 6, identical auxiliary cutting edges 12 associated with the side surfaces 8, and four identical corner cutting edges 14 which are rounded and extend between adjacent main cutting edges 10 and auxiliary cutting edges 12, merging continuously therewith. The cutting insert 1 has an imaginary reference plane designated as P in FIG. 3, which passes through extreme points of the corner cutting edges 14.

Figure 3:
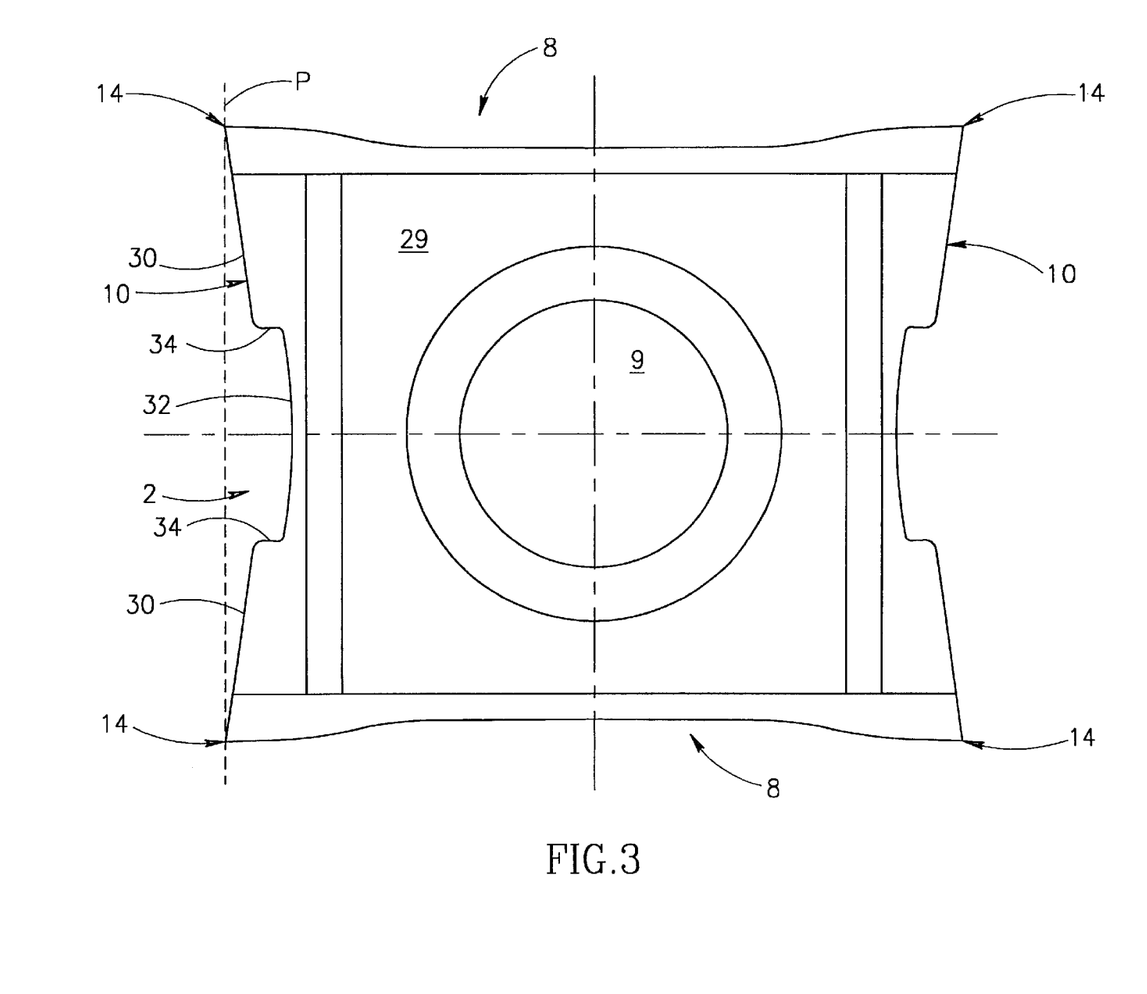
FIG. 3 is a top view of the cutting insert shown in FIG. 1.
Figure 4:
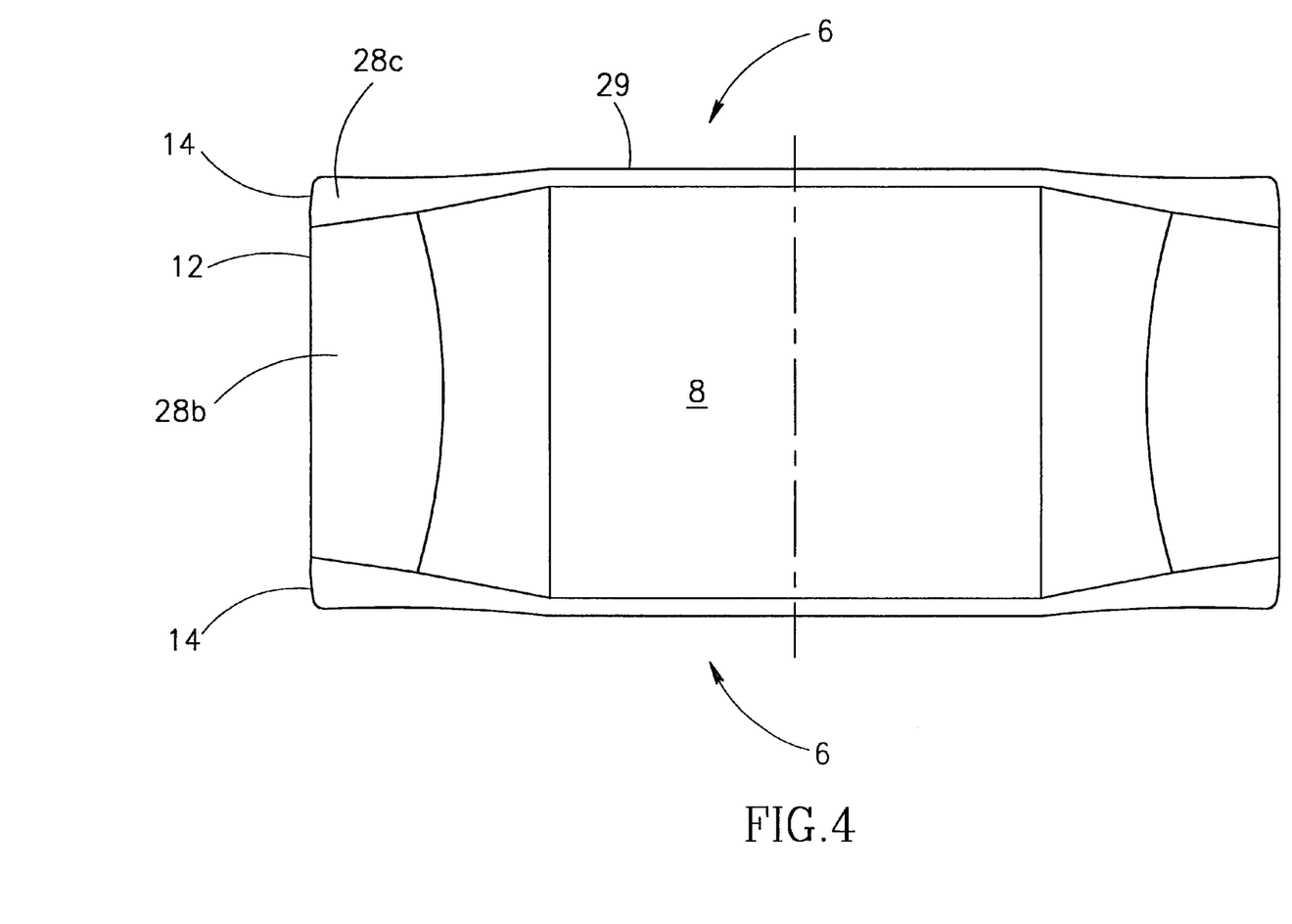
FIG. 4 is a side view of the cutting insert shown in FIG. 1.

As seen in FIG. 3, the operative front surface 2 is generally depressed relative to the reference plane P along its entire circumference.

More particularly, as seen in FIG. 1, the operative front surface 2 has a peripheral surface, generally designated as 18, having portions 20, 22 and 24 which extend, respectively, along the main cutting edges 10, the auxiliary cutting edges 12 and the corner cutting edges 14. As seen in FIGS. 5a to 5d, these portions extend inwardly away from their corresponding main, auxiliary and corner cutting edges 10, 12 and 14 and constitute their respective chip rake surfaces 20, 22, 24. As shown in FIGS. 5a to 5d, the chip rake surfaces 20, 22 and 24 form respective angles $\theta_{10}$, $\theta_{12}$ and $\theta_{14}$ with a normal to the reference plane P, which angles may be of different values and may vary along the length of the respective cutting edges 10, 12 and 14.

As seen in FIGS. 1, 2 and 5A to 5D, the main cutting edges 10, the auxiliary cutting edges 12 and the corner cutting edges 14 are provided 20 with a land 26 extending therefrom towards respective chip rake surfaces 20, 22 and 24 associated therewith.

As seen in FIGS. 1, 3, 4 and 5A to 5D, the upper and lower surfaces 6 and side surfaces 8 of the cutting insert 1 and insert corner portions 27 therebetween are each formed with relief flank surfaces 28a, 28b and 28c disposed, respectively, adjacent the main cutting edges 10, the auxiliary cutting edges 12 and corner cutting edges 14, and provide these cutting edges with appropriate relief angles, when the insert is mounted on a cutting tool. The relief flank surface 28a is, preferably, substantially normal to the reference plane P. The upper and lower surfaces 6 are each formed with a projecting central base portion 29 for the support of the insert in the cutting tool.

As seen in FIG. 3, each main cutting edge 10 extends from adjacent corner cutting edge 14 generally inwardly relative to the reference plane P and has two identical lateral component cutting edges 30 extending away from the adjacent corner cutting edges 14 and away from the reference plane P towards a central component cutting edge 32. The lateral component cutting edges 30 merge with the central component cutting edge 32 via intermediate component cutting edges 34 oriented transversely to the reference plane P. Preferably, the intermediate component cutting edges 34 are oriented so that the associated lateral component cutting edges 30 and the central component cutting edge 32 partially overlap as seen in a direction perpendicular to the reference plane P, whereby effective chip splitting may be provided during a cutting operation.

Figure 5A:
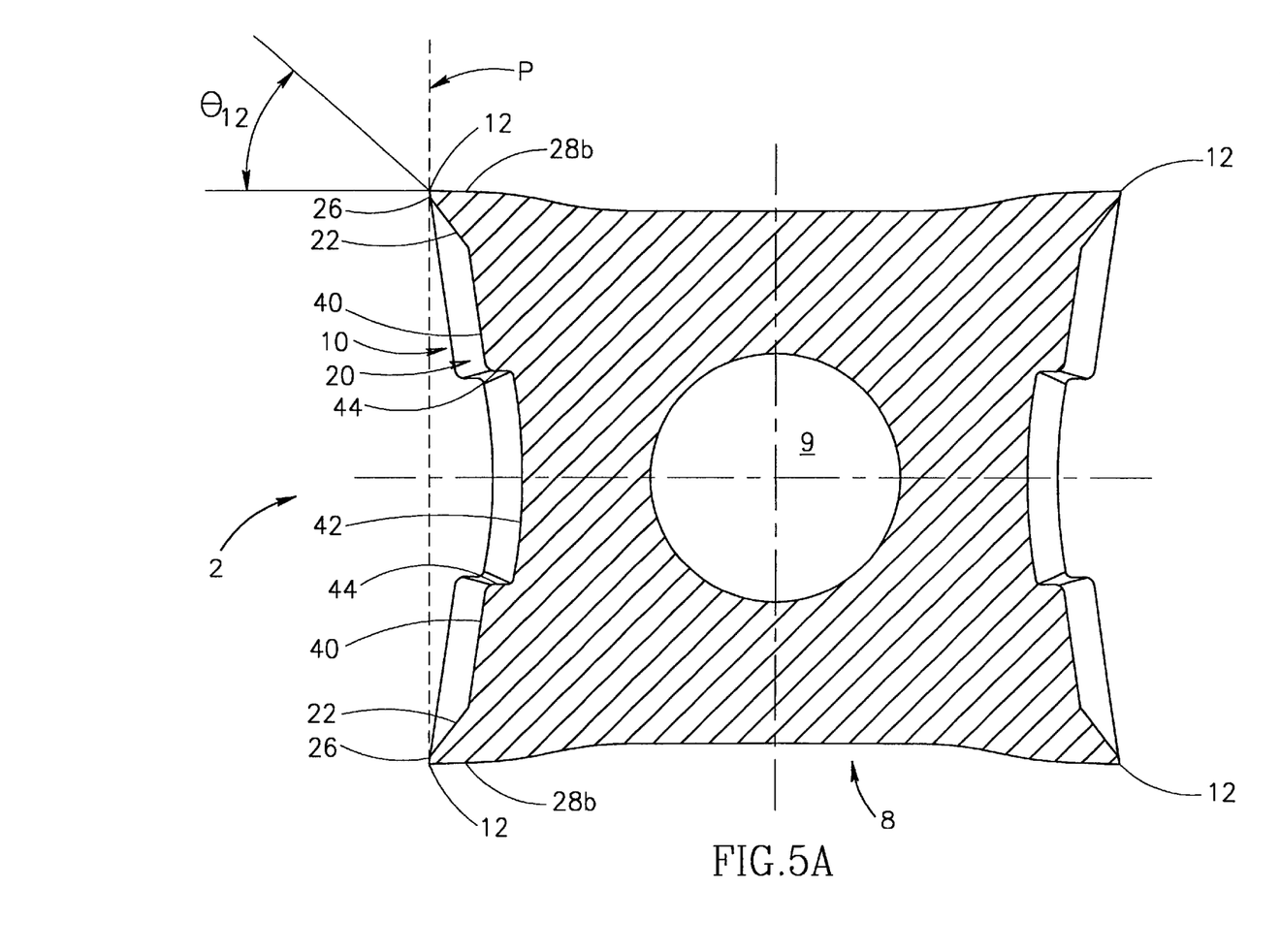
FIGS. 5A, 5B, 5C and 5D are cross-sectional views of the cutting insert shown in FIG. 2, taken along the respective lines A—A, B—B, C—C and D—D.
Figure 5B:
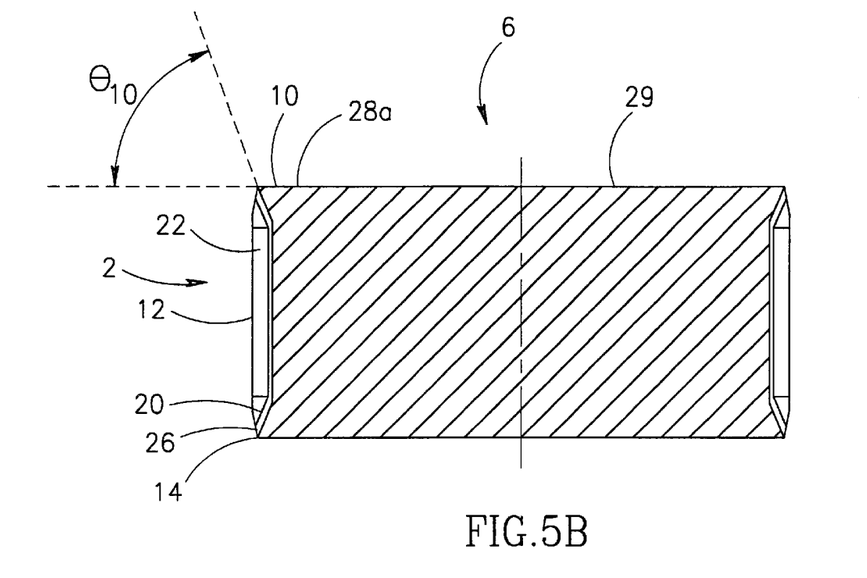
Figure 5C:
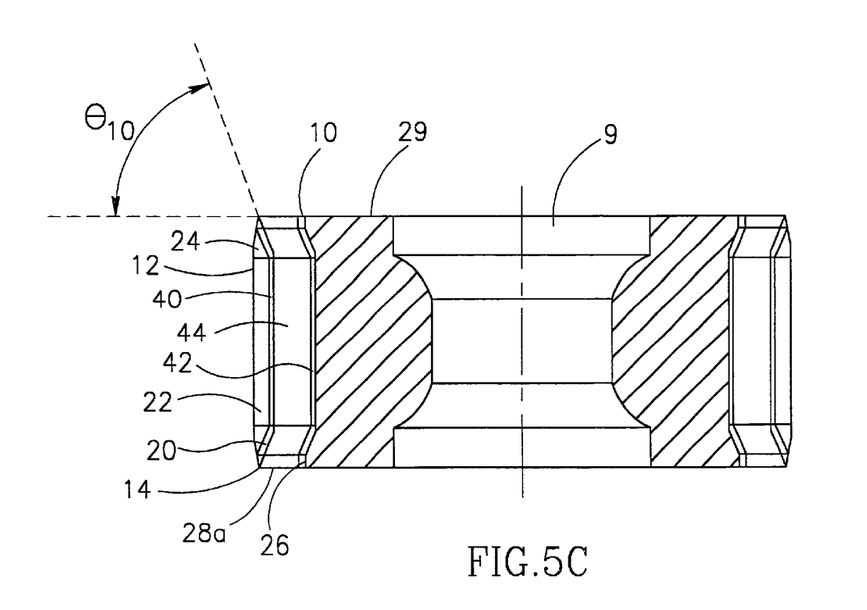
Figure 5D:
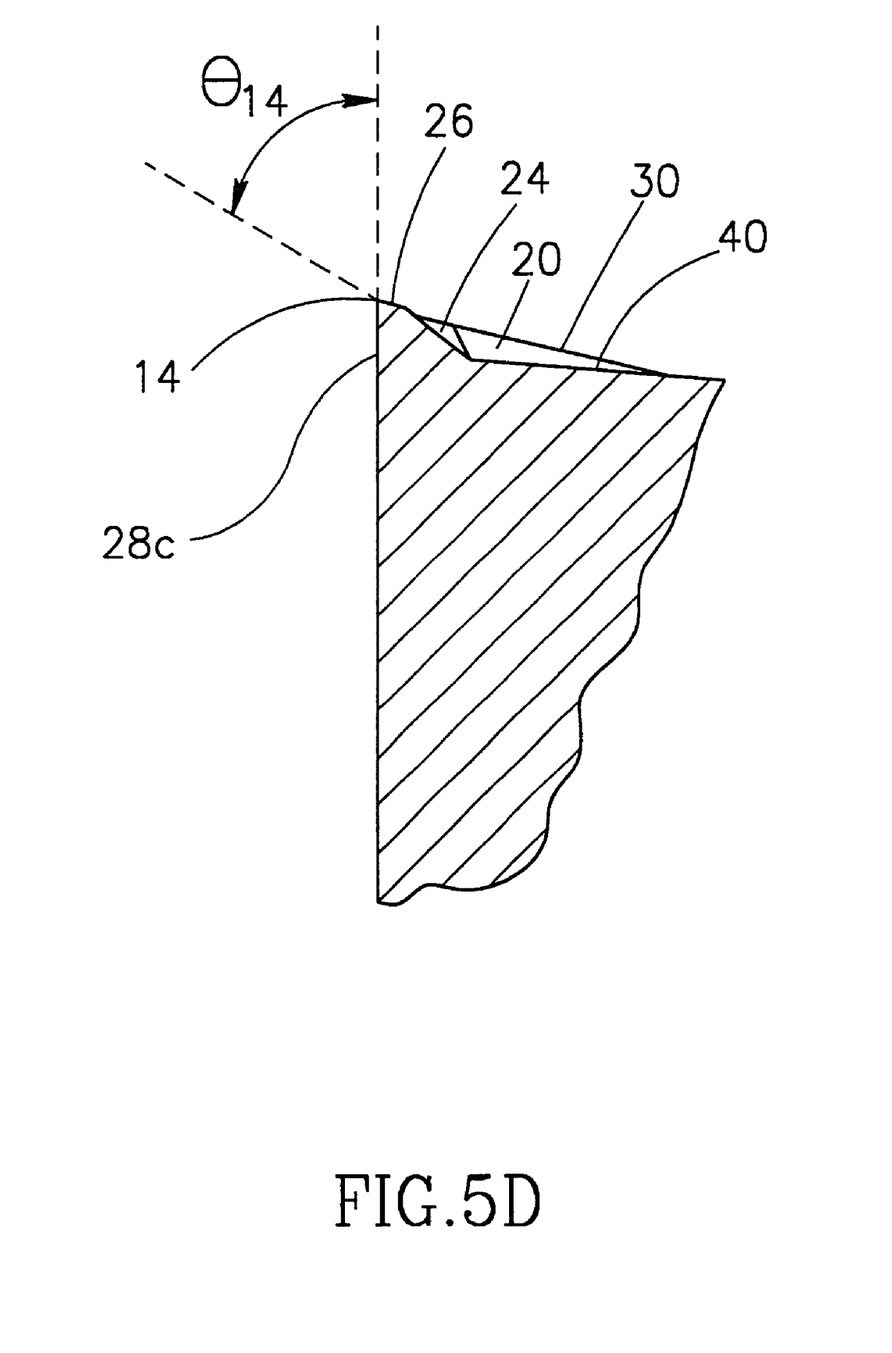

As clearly seen in FIGS. 1 and 5a, the operative front surface 2 generally repeats the geometry of the main cutting edges 10, i.e. it has lateral portions 40 which extend inwardly away from the auxiliary cutting edges 12 towards a central portion 42 and merge therewith via intermediate portions 44. When the cutting insert 1 is mounted in a cutting tool, the lateral portions 40 of its rear surface 2 function as the insert's positioning surfaces.

Figure 6A:
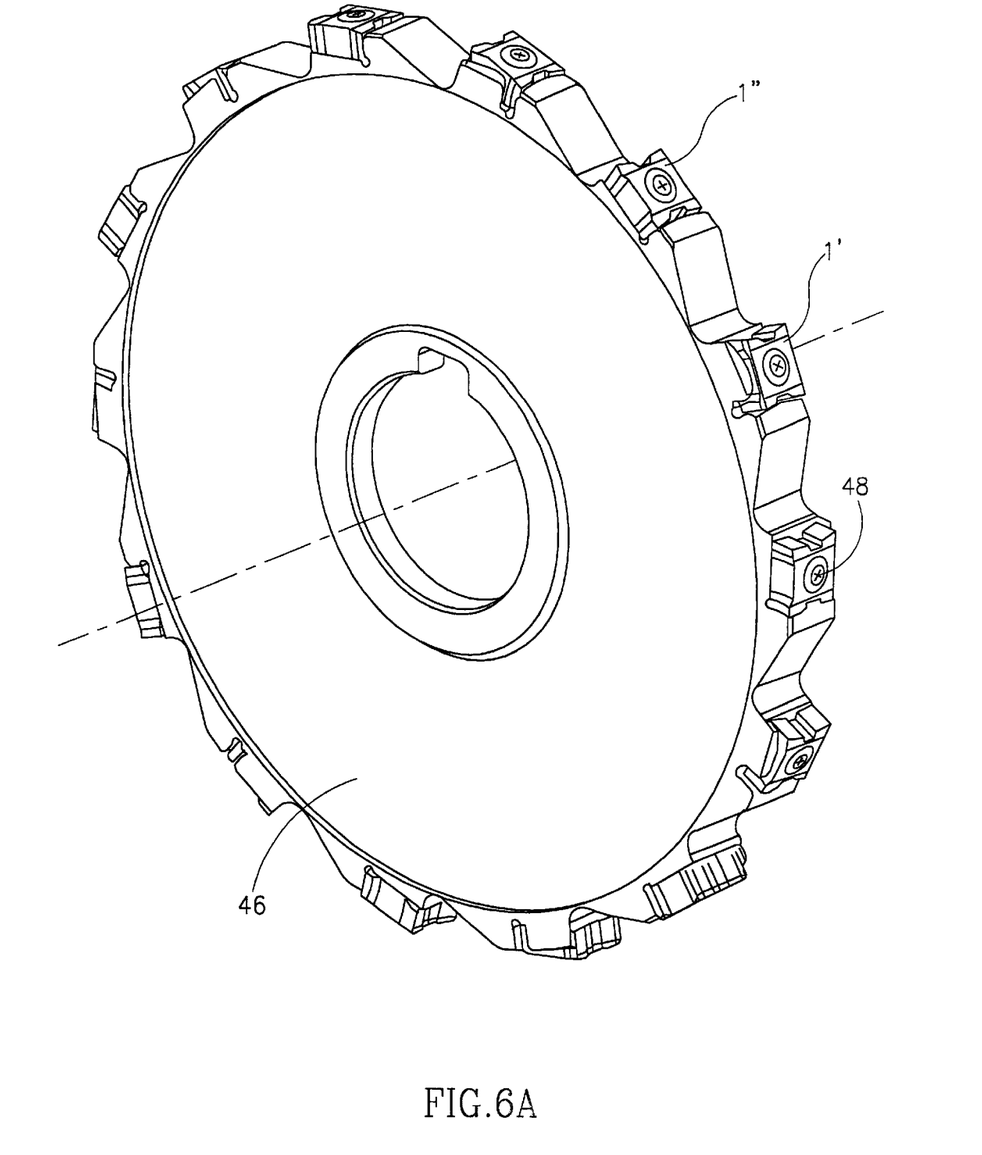
FIG. 6A is a perspective view of a slotting disk cutter with cutting inserts according to the present invention mounted therein in a right-hand and left-hand manner.
Figure 7:
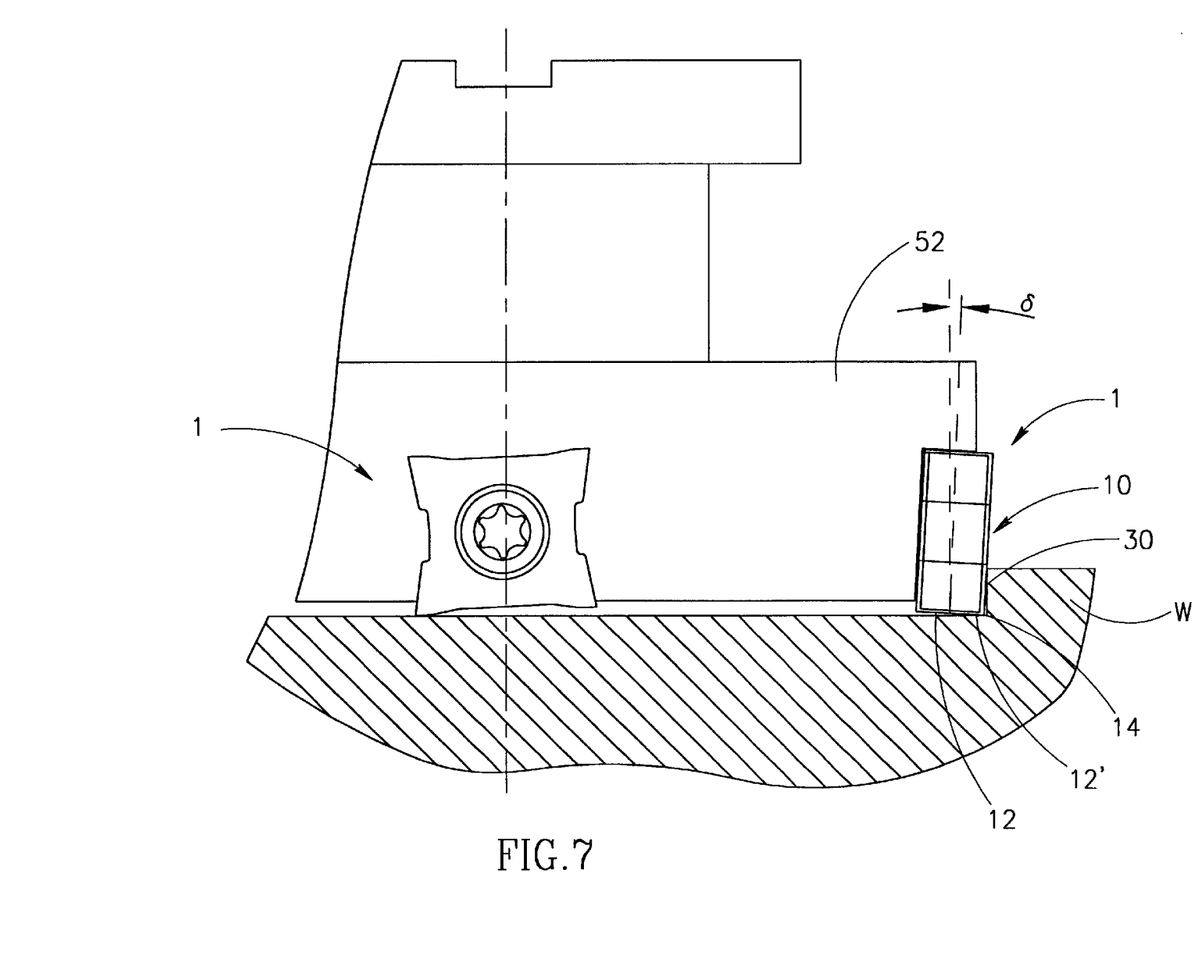
FIG. 7 is a partial side view of a face milling cutter with cutting inserts according to the present invention mounted therein.
Figure 8A:
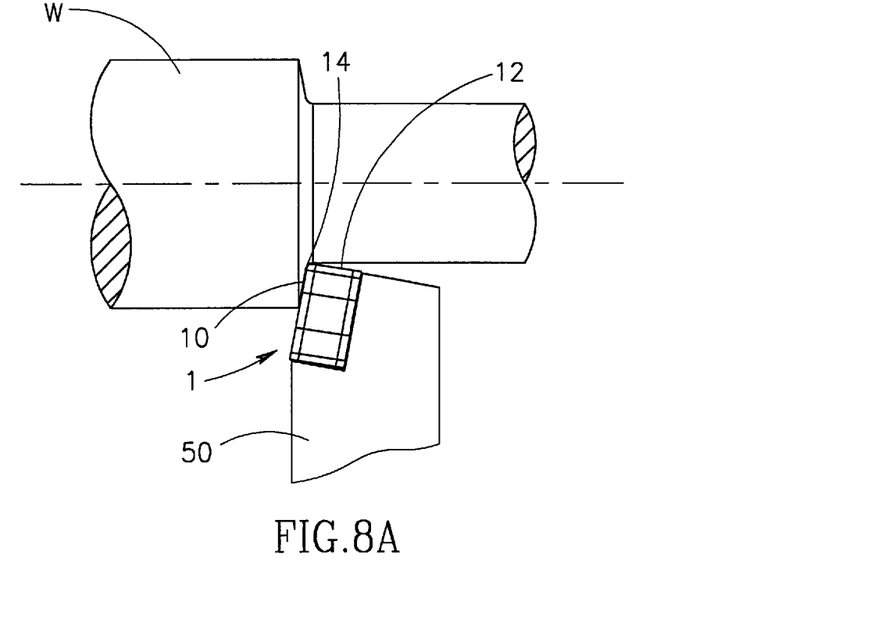
FIGS. 8A and 8B are plan views of two different turning tools with a cutting insert according to the present invention mounted therein.
Figure 8B:
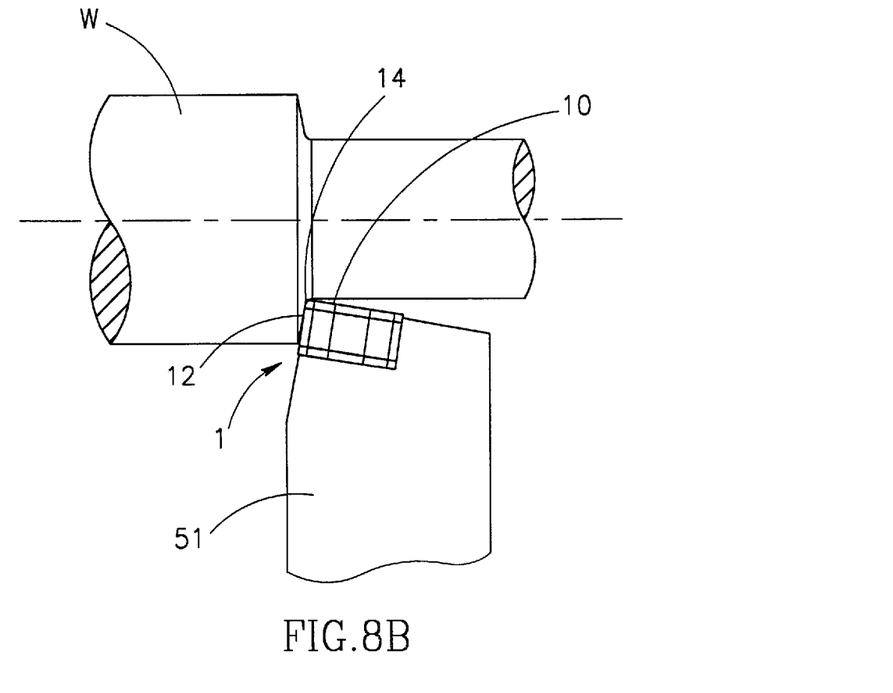

FIGS. 6A and 7 show, by way of example only, the use of a cutting insert of the present invention in milling cutters, where the main cutting edge of the insert or at least one lateral component cutting edge thereof functions as a peripheral cutting edge and the auxiliary edge functions as a front cutting edge. FIGS. 8a and 8b show examples of the use of the cutting insert 1 of the present invention in turning cutting tools.

Figure 6B:
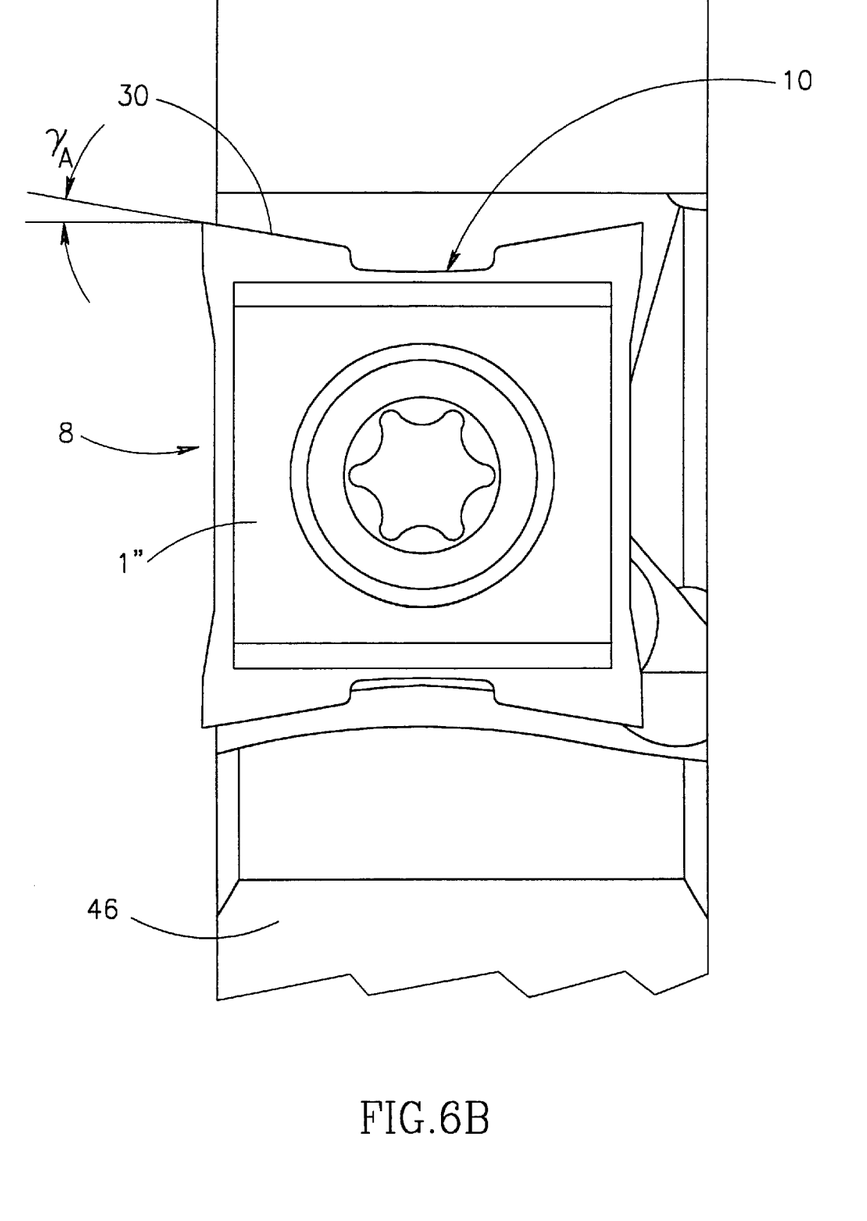
FIG. 6B is a top view of the cutting insert shown in FIG. 1, in an enlarged scale, when mounted in the slotting disk cutter shown in FIG. 6A.

FIG. 6A shows a slotting cutter 46 with cutting inserts 1' and 1", according to the present invention, tangentially mounted therein by means of clamping screws 48, respectively, in a left-hand and right-hand manner. As shown in FIG. 6B, by virtue of the fact that the lateral component cutting edges 30 of the main cutting edge 10 are oriented as described above, it is ensured that an operative lateral cutting edge 30 associated with a free side surface 8 of the cutting insert 1", has a required positive axial rake angle γA. Due to the fact that the lateral component cutting edges 30 are inclined in opposite senses, the axial cutting forces acting on the cutting edge 10 during a cutting operation are counterbal- anced.

FIG. 7 shows a face milling cutter 52 with cutting inserts 1 according to the present invention mounted therein for machining a workpiece W. As seen, in cutting insert 1 the lateral component cutting edge of the main cutting edge 10 functions as a peripheral cutting edge and a lateral portion 12, of the auxiliary cutting edge 12 disposed adjacent the operative corner cutting edge 14 functions as a wiper. In the milling cutter 52, the remainder of the cutting edge 12 is provided with a necessary clearance from the workpiece face by means of mounting the cutting insert 1 at an appropriate negative angle δ. As shown in FIG. 7, the portion 12' defines an angle of 90° with adjacent lateral component cutting edge 30. Alternatively, the angle between the lateral portion 12' and the adjacent lateral component cutting edges 30 may be slightly greater than 90°.

FIG. 8a shows a turning cutting tool 50 machining a workpiece W, in which the cutting insert 1 is mounted so as to present an operative cutting edge 10 and an operative corner cutting edge 14.

FIG. 8b shows a turning tool 51 machining a workpiece W, in which the cutting edge 12 functions as an operative cutting edge and the cutting edge 10 does not participate in cutting.

FIGS. 9A to 9D and FIGS. 13A to 13C illustrate alternative embodiments of respective cutting inserts 60 and 70 according to the present invention for use, respectively, in 90° and 45° shoulder milling operations.

Figure 9A:
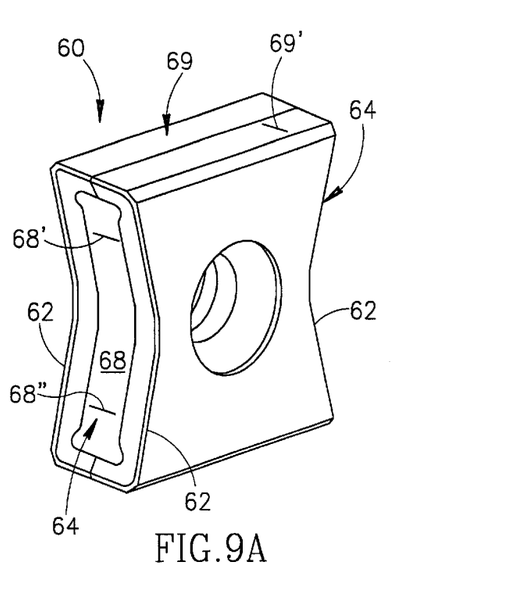
FIGS. 9A, 9B, 9C and 9D are, respectively, perspective, plan, front and side views of a cutting insert according to an alternative embodiment of the present invention.
Figure 9B:
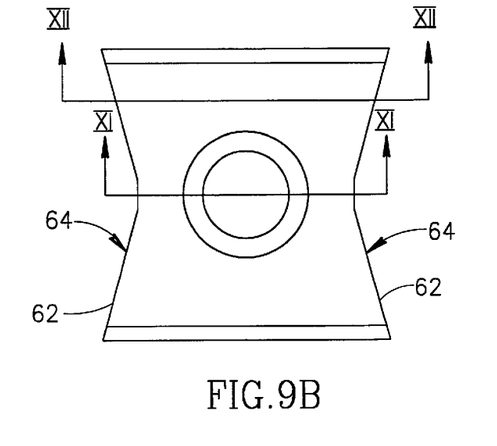
Figure 9C:
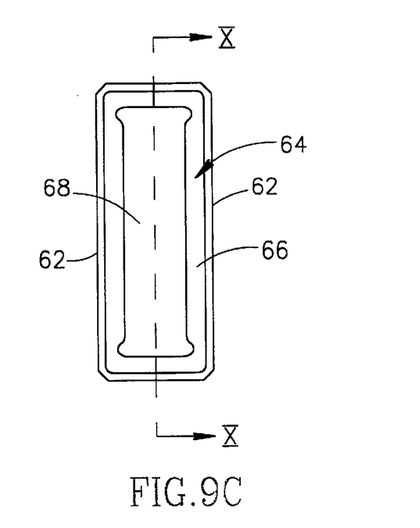
Figure 9D:
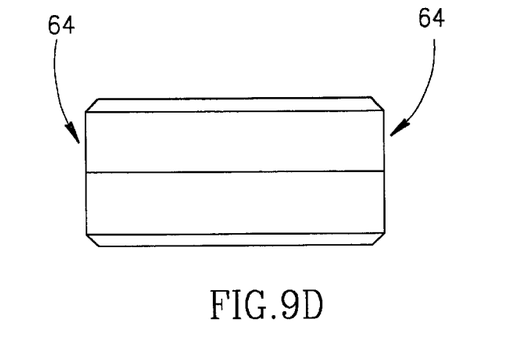
Figure 10:
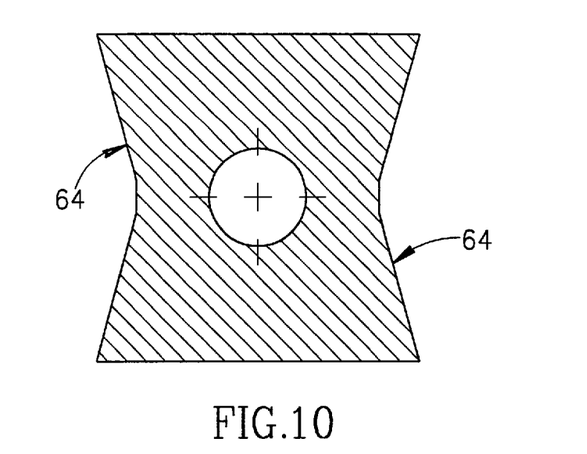
FIG. 10 is a cross-sectional view of the cutting insert shown in FIGS. 9A–9D, taken along the line X—X in FIG. 9C.
Figure 11:
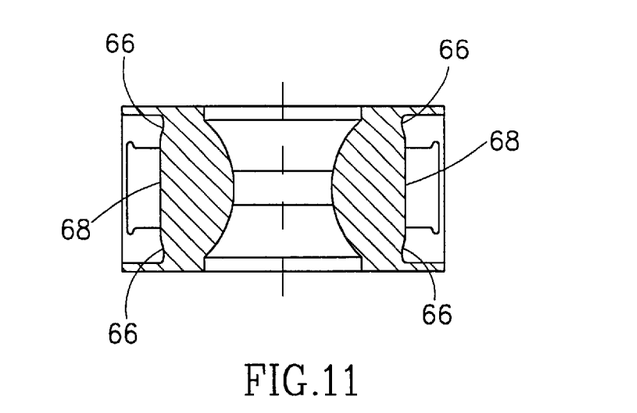
FIGS. 11 and 12 are cross-sectional views of the cutting insert shown in FIGS. 9A–9D, taken along the respective lines XI—XI and XII—XII in FIG. 9B.
Figure 12:
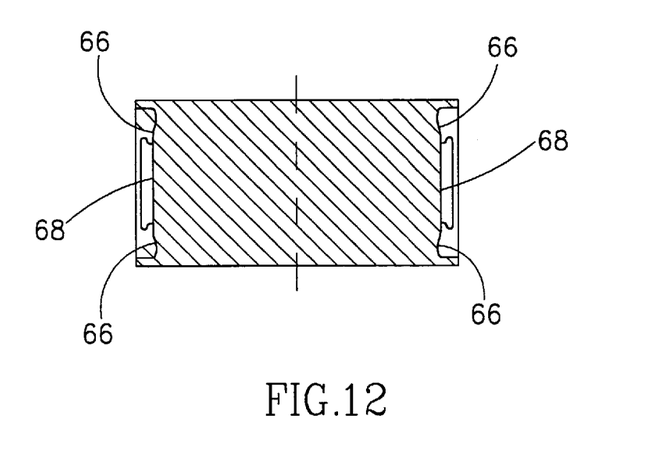

As seen in FIGS. 9A, 9B and 10, in the cutting insert 60 main cutting edges 62 and, consequently, front and rear surfaces 64 are of a generally concave shape. The front and rear surfaces 64 are formed with a chip forming groove 66 (FIGS. 11 and 12) and a central protruding surface 68 lateral portions 68' and 68" of which serve as a pair of positioning surfaces, when the insert 60 is mounted in a cutting tool. Additional positioning surface of the cutting insert 60 is constituted by a lateral region 69' of its side surface 69.

Figure 13A:
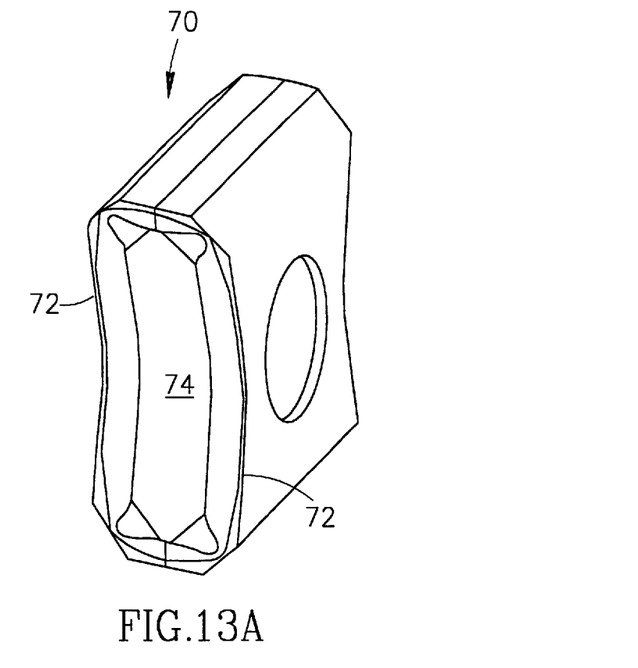
FIGS. 13A, 13B and 13C are, respectively, perspective, front and side views of a cutting insert according to another alternative embodiment of the present invention.
Figure 13B:
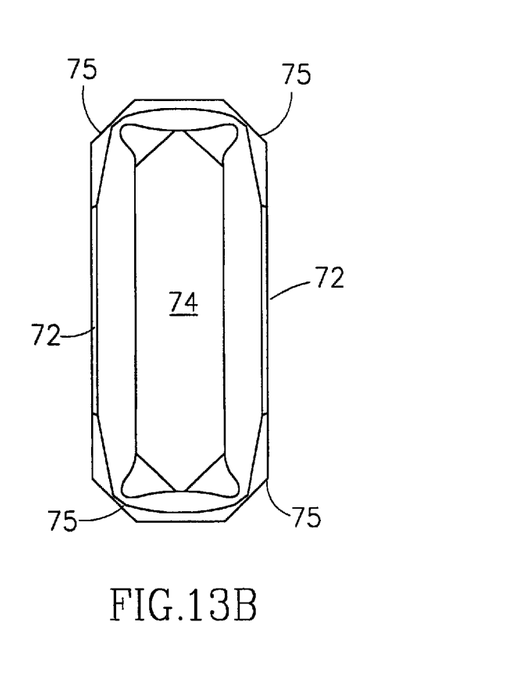
Figure 13C:
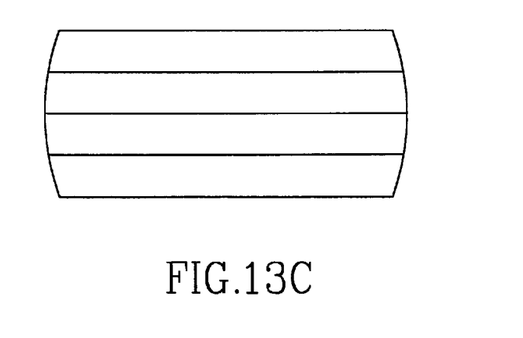

The cutting insert 70 shown in FIGS. 13A to 13C is similar to the cutting insert 60 shown in FIGS. 9A to 9D in the shape of its main cutting edges 72 and front and rear surfaces 74, the difference being mainly in that secondary cutting edges 75, capable of functioning as wipers, define an angle of 45° with adjacent main cutting edges 72.

Cutting inserts according to the present invention may be used for any other appropriate applications and also may have alternative designs comprising features not described above. For example, the main cutting edges of the cutting inserts may be continuously concave. Their geometry may be asymmetric relative to their central points. The central component cutting edge of the main cutting edges may protrude relative to adjacent lateral portions in the outward direction of the insert. The auxiliary cutting edges may have any required configuration rather than being substantially straight as shown in the drawings. All cutting edges may have any other appropriate shapes and cutting geometries. Also, the central and lateral portions of the front and rear surfaces may be planar and non-planar, e.g. they may be specifically shaped to provide chip control means of any appropriate geometry. Furthermore, the central and lateral portions of the operative front surface do not necessarily need to be fully depressed relative to the reference plane P but rather they may have areas protruding outwardly therefrom.

List of Reference Numerals

| | |
|---|---|
| 1 | cutting insert |
| 2 | front and rear operative surfaces |
| 6 | upper and lower surfaces |
| 8 | another pair of opposite side surfaces |
| 9 | clamping screw bore |
| 10 | main cutting edges |
| 12 | auxillary cutting edges |
| 12' | a portion of the side edge 12 functioning as a wiper |
| 14 | corner cutting edges |
| 18 | peripheral surface of the front operative surface 2 |
| 20, 22, 24 | portions of the peripheral surface 18 extending along respective cutting edges 10, 12 and 14 |
| 26 | land |
| 27 | insert corner portions |
| 28a, 28b, 28c | relief flank surfaces of respective cutting edges 10, 12, 14 |
| 29 | projecting central base portion |
| 30 | lateral component cutting edges |
| 32 | central component cutting edge |
| 34 | intermediate component cutting edges |
| 40 | lateral portions of the front operative surface 2 |
| 42 | central portion of the front operative surface |
| 44 | intermediate portions of the front operative surface |
| 46 | slotting cutter |
| 48 | clamping screw |
| 50, 51 | turning cutting tools |
| 52 | face milling cutter |
| 60 | alternative cutting insert |
| 62 | main cutting edges of the cutting insert 60 |
| 64 | front and rear surfaces of the cutting insert 60 |
| 66 | chip forming groove |
| 68 | central protruding surface |
| 68' and 68" | lateral portions of the central protruding surface 68 |
| 69 | side surfaces of the cutting insert 60 |
| 69' | lateral region of the side surface 69 |
| 70 | alternative cutting insert |
| 72 | main cutting edges of the cutting insert 70 |
| 74 | front and rear surfaces of the cutting insert 70 |
| 75 | corner cutting edges of the cutting insert 70 |
| A | longitudinal axis of the clamping screw bore 9 |
| P | imaginary reference plane |
| W | workpiece |
| γA | axial rake angle of the component cutting edge 30 in the cutting tool 46 |
| θ10, θ12, θ14 | angles defined between the chip rake surfaces 20, 22 and 24 and a normal to the reference plane P |
| δ | angle of inclination of the cutting insert 1 in the milling cutter 52, when seen in the front view |

What is claimed is:

1. A tangential cutting insert having a body with an operative front surface associated with upper and lower main cutting edges, each of said main cutting edges being connected by first and second corner cutting edges to respective first and second side auxiliary cutting edges, each of the main cutting edges side auxiliary cutting edges and comer cutting edges having a rake surface associated therewith in the front surface the rake surfaces extending along an entire circumference of the front surface and in an inward direction of the cutting insert, the cutting insert having an imaginary reference plane passing through extremities of the corner cutting edges thereof, wherein each of said main cutting edges extends from its associated corner edges in an inward direction of the cutting insert away from said reference plane.

2. A cutting insert according to claim 1, wherein each of said main cutting edges has:
   two lateral component cutting edges, each lateral component cutting edge extending from an adjacent comer edge in the inward direction of the cutting insert and
   a central component cutting edge therebetween, said central component cutting edge being substantially parallel to said reference plane.

3. A cutting insert according to claim 2, wherein said lateral component cutting edges merge with the central component cutting edge via intermediate component cutting edges which are oriented so that the associated lateral component cutting edges and the central component cutting edge partially overlap as seen in a direction perpendicular to the reference plane.

4. A cutting insert according to claims 1 or 2, wherein each of the side auxiliary cutting edges is associated with an adjacent component surface of the operative front surface, each of said component surfaces extending from the associated side auxiliary cutting edge in the inward direction of the cutting insert away from said reference plane.

5. A cutting insert according to claim 1, wherein the cutting insert is indexable around an axis of rotational symmetry, which is substantially parallel to the reference plane of the cutting insert and substantially transverse to the main cutting edges.

6. A cutting insert according to claim 5, wherein the insert's body has a prismatic shape with a pair of identical front and rear surfaces at two ends thereof, opposite upper and lower surfaces and a pair of opposite side surfaces extending between the front and rear surfaces.

7. A cutting insert according to claim 1, wherein each rake surface associated with said main cutting edges, auxiliary cutting edges and comer cutting edges is oriented at a different acute angle with respect to a normal to said imaginary reference plane.

8. A cutting insert according to claim 1, wherein an acute angle formed by the rake surface of each main cutting edge with a normal to said imaginary reference plane varies along the main cutting edge of the insert.

9. A cutting insert according to claim 1, wherein the body of the cutting insert is formed with a clamping screw bore having a longitudinal axis, which is substantially parallel to said reference plane of the cutting insert and substantially transverse to said main cutting edges.

10. A cutting insert according to claim 1, wherein a portion of each auxiliary cutting edge of the insert disposed adjacent the comer cutting edge and merging therewith is capable of functioning as a wiper.

11. A tangential cutting insert comprising:
at least one operative front surface associated with upper and lower main cutting edges, the upper main cutting edge being connected by first and second comer cutting edges to respective first and second side auxiliary cutting edges, the lower main cutting edge being connected by third and fourth comer cutting edges to respective said first and second side auxiliary cutting edges, wherein:
extreme points of the comer cutting edges define an imaginary reference plane on one side of which the cutting insert entirely lies,
each of the main cutting edges extends from its associated comer cutting edges in a direction away from said reference plane, and
each of the cutting edges has a rake surface associated therewith in the front surface.

12. The tangential cutting insert according to claim 11, wherein each of the main cutting edges comprises:
two lateral component cutting edges extending from adjacent comer cutting edges, and
a central component cutting edge connected to the lateral component cutting edges by intermediate component cutting edges which are oriented transversely to the reference plane.

13. The tangential cutting insert according to claim 12, wherein lateral component cutting edges and the central component cutting edges partially overlap as seen in a direction perpendicular to the reference plane.

14. The tangential cutting insert according to claim 11, wherein the insert is provided with a rear surface substantially identical to the front surface, the insert being indexable about an axis of rotational symmetry which is substantially parallel to the reference plane.

15. The tangential cutting insert according to claim 11, further comprising a clamping screw bore having a longitudinal axis coinciding with said axis of rotational symmetry.

16. The tangential cutting insert according to claim 11, wherein the rake surfaces associated with the cutting edges extend along an entire circumference of the front surface and in direction away from the imaginary reference plane.

17. The tangential cutting insert according to claim 11, wherein an acute angle formed between (a) the rake surface of each main cutting edge, and (b) a normal to the imaginary reference plane, varies along the main cutting edge.

* * * * *